(12) United States Patent
Xiang et al.

(10) Patent No.: US 11,326,651 B2
(45) Date of Patent: May 10, 2022

(54) SHIFTING SYSTEM INCLUDING A SHIFTING ASSEMBLY AND METHOD OF OPERATING THE SAME

(71) Applicant: BorgWarner Inc., Auburn Hills, MI (US)

(72) Inventors: Xinqian Xiang, Clawson, MI (US); Calahan B. Campton, Royal Oak, MI (US); R. Keith Martin, Marlette, MI (US)

(73) Assignee: Borg Warner Inc., Auburn Hills, MI (US)

( * ) Notice: Subject to any disclaimer, the term of this patent is extended or adjusted under 35 U.S.C. 154(b) by 0 days.

(21) Appl. No.: 17/112,181

(22) Filed: Dec. 4, 2020

(65) Prior Publication Data

US 2021/0172482 A1 Jun. 10, 2021

Related U.S. Application Data

(60) Provisional application No. 62/946,156, filed on Dec. 10, 2019.

(51) Int. Cl.
  *F16D 13/52* (2006.01)
  *F16D 21/08* (2006.01)
  (Continued)

(52) U.S. Cl.
  CPC ............. *F16D 13/52* (2013.01); *F16D 13/08* (2013.01); *F16D 13/71* (2013.01); *F16D 21/08* (2013.01);
  (Continued)

(58) Field of Classification Search
  CPC .......... F16D 13/52; F16D 21/08; F16D 23/04; F16D 13/08; F16D 13/71; F16D 23/00; F16D 13/583; F16D 13/56
  See application file for complete search history.

(56) References Cited

U.S. PATENT DOCUMENTS 9,151,345 B2   10/2015   Showalter
9,726,236 B2   8/2017    Papania
(Continued)

FOREIGN PATENT DOCUMENTS

DE   102019003004 A1   10/2020
FR   2604228    *   9/1986

OTHER PUBLICATIONS

Machine language translation of FR2604228.*
(Continued)

*Primary Examiner* — Mark A Manley
(74) *Attorney, Agent, or Firm* — Howard & Howard Attorneys PLLC

(57) ABSTRACT

A shifting system includes an input member, a disconnect, an output member, and a shifting assembly to selectively rotationally couple the input member and the output member. The shifting assembly includes an input hub having a disconnectable component engageable with the disconnect and a clutch engagement component extending radially away from an axis. A plurality of clutch plates is coupled to the clutch engagement component and is moveable between engaged and disengaged positions. A biasing member is coupled to the clutch plates to bias the clutch plates toward the engaged position, and an apply plate is coupled to the biasing member. The apply plate is moveable between a first plate position where the clutch plates are in the engaged position, and a second plate position where the clutch plates are in the disengaged position. A clutch plate carrier is coupled to the clutch plates and to the output member.

20 Claims, 12 Drawing Sheets

(51) Int. Cl.
*F16D 23/04* (2006.01)
*F16D 13/08* (2006.01)
*F16D 13/71* (2006.01)
*F16D 23/00* (2006.01)
*F16D 13/58* (2006.01)
*F16D 13/56* (2006.01)

(52) U.S. Cl.
CPC ............ F16D 23/04 (2013.01); *F16D 13/583* (2013.01); *F16D 23/00* (2013.01)

(56) References Cited

U.S. PATENT DOCUMENTS

| | | | |
|---|---|---|---|
| 9,797,458 B2 | 10/2017 | Damm et al. | |
| 9,939,027 B2 | 4/2018 | Damm et al. | |
| 10,151,359 B2 | 12/2018 | Campton | |
| 2011/0155530 A1* | 6/2011 | Vierk | F16D 13/38 192/48.6 |
| 2014/0033844 A1 | 2/2014 | Rothvoss et al. | |
| 2014/0318918 A1* | 10/2014 | Mordukhovich | F16D 21/08 192/48.3 |
| 2018/0112725 A1 | 4/2018 | Campton et al. | |
| 2018/0126839 A1 | 5/2018 | Park | |
| 2018/0335110 A1 | 11/2018 | Yang et al. | |
| 2019/0301576 A1 | 10/2019 | Harada | |
| 2019/0351762 A1 | 11/2019 | Yang et al. | |
| 2020/0309201 A1 | 10/2020 | Genesius et al. | |
| 2020/0347916 A1 | 11/2020 | Sung et al. | |
| 2021/0164543 A1 | 6/2021 | Yang et al. | |

OTHER PUBLICATIONS

Machine-assisted English language abstract and machine-assisted English language translation for DE 10 2019 003 004 A1 extracted from espacenet.com database on Aug. 9, 2021, 16 pages.

Back, Ottmar, "Basics of Synchronizers", Hoerbiger, Jan. 2013, 78 pages.

Echtler, Peter et al., "Presentation: Alternative Schaltelemente—E-Drive+ Concept with TorqueLINE Twin Cone and TorqueLINE Disconnect Clutch", 16th International CTI Symposium, Berlin, Hoerbiger Antriebstechnik Holding GmbH, Dec. 2017, 28 pages.

Echtler, Peter et al., "Innovative Shift Elements For Power-Shiftable Two-Speed Electric Axle With Torque Vactoring Function", Horerbiger Antriebstechnik Holding GmbH, Germany, 2018, 13, pages.

U.S. Appl. No. 17/116,209, filed Dec. 9, 2020.
U.S. Appl. No. 17/116,239, filed Dec. 9, 2020.
U.S. Appl. No. 17/116,263, filed Dec. 9, 2020.

* cited by examiner

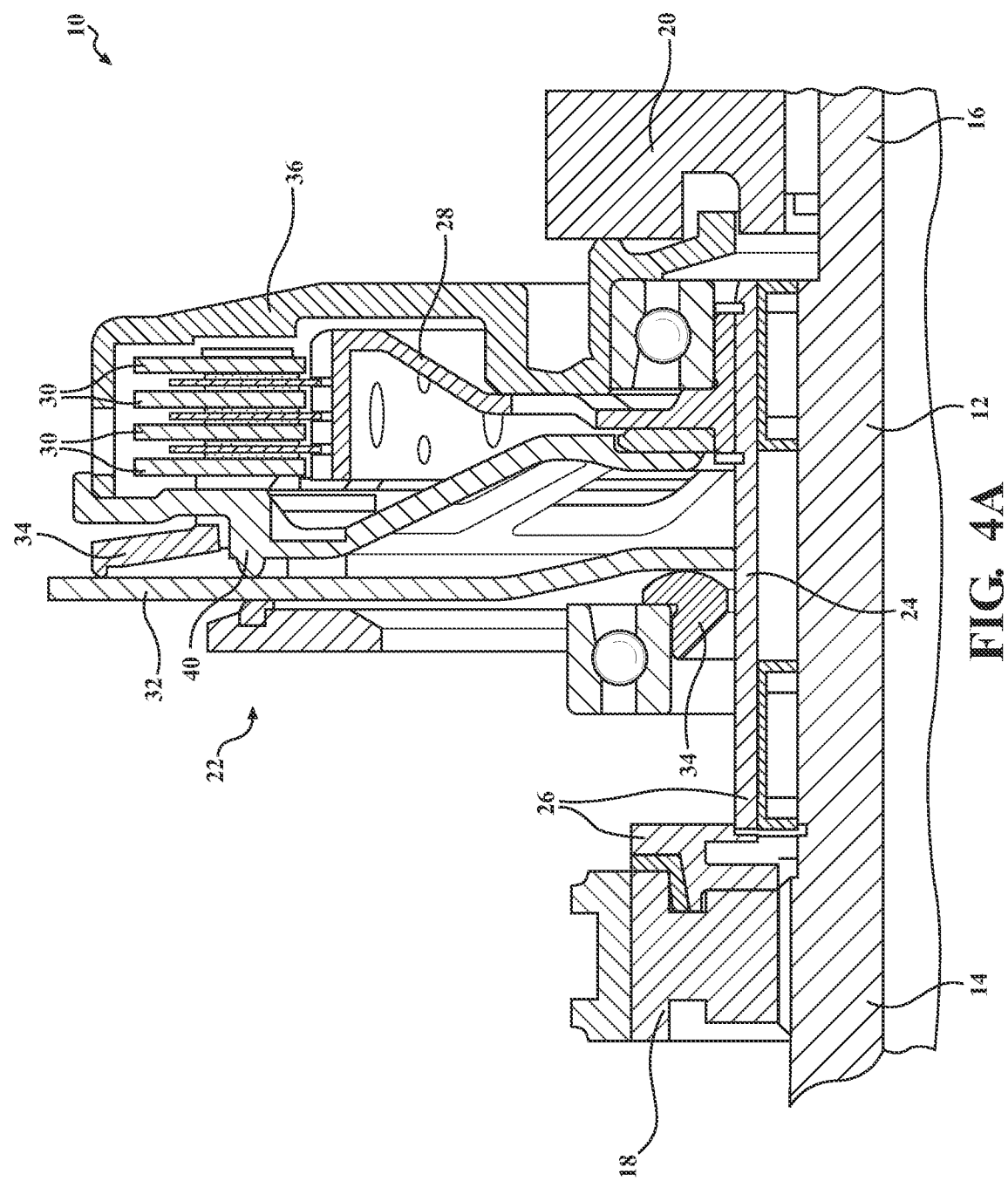

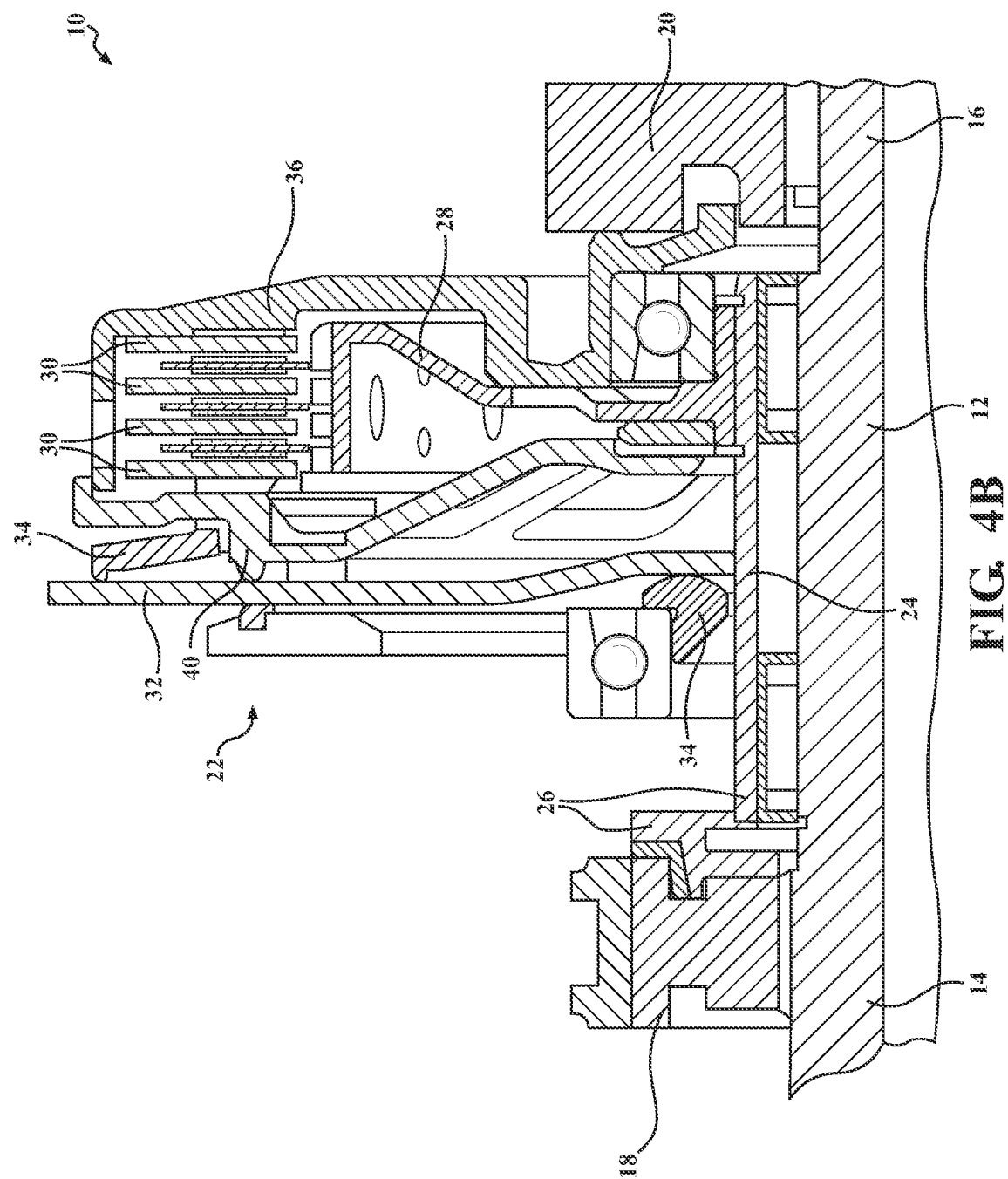

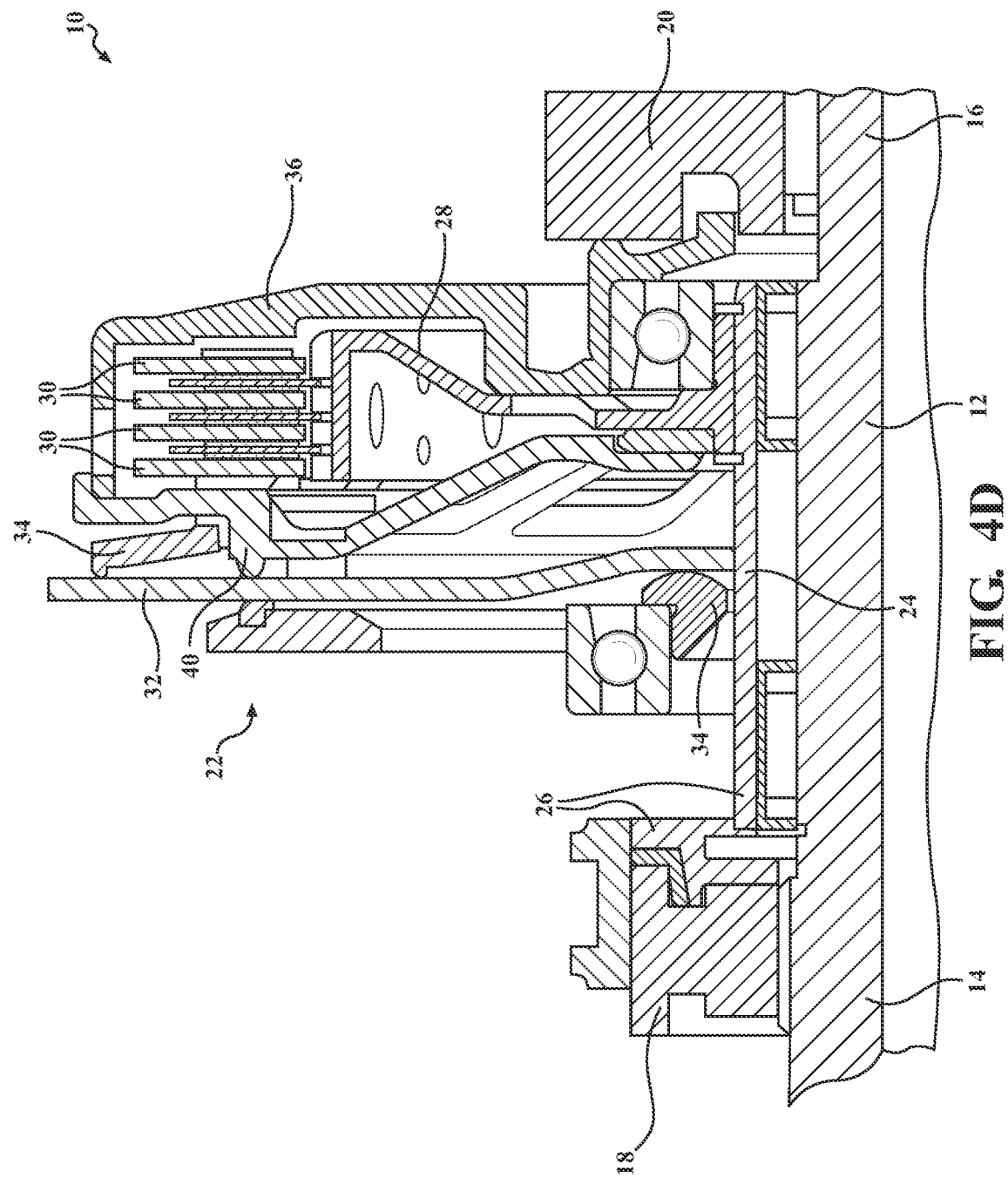

SHIFTING SYSTEM INCLUDING A SHIFTING ASSEMBLY AND METHOD OF OPERATING THE SAME

BACKGROUND OF THE INVENTION

1. Field of the Invention

The present invention generally relates to a shifting system including a shifting assembly for a vehicle transmission, and to a method of operating the shifting system.

2. Description of the Related Art

Conventional vehicles known in the art typically include a motor having a rotational output as a rotational input into a vehicle transmission. The motor is typically an internal combustion engine or an electric motor, and generates the rotational output which is selectively transferred to the vehicle transmission which, in turn, transfers rotational torque to one or more wheels of the vehicle. The vehicle transmission changes the rotational speed and torque generated by the motor through a series of predetermined gearsets, whereby changing between the gearsets enables the vehicle to travel at different vehicle speeds for a given motor speed. Commonly, the motor is the electric motor coupled to the vehicle transmission in an axle connected to the wheels of the vehicle.

Rotational input into the vehicle transmission typically requires a shifting system to selectively transfer torque to the components of the vehicle transmission. A typical shifting system includes an input member (e.g. the rotational output from the motor) rotatable about an axis, a disconnect coupled to the input member, and an output member (e.g. the rotational input to the vehicle transmission) selectively rotatable with the input member about the axis. A shifting assembly is also typically required to selectively rotationally couple the input member and the output member.

The shifting systems known in the art often result in high drag losses, lowering the efficiency of torque transfer between the motor and the vehicle transmission. Additionally, typical shifting systems produce rough engagement between the motor and the components of the vehicle transmission through connection with the disconnect, resulting in vibrations of the vehicle and an uncomfortable driving experience.

Accordingly, it is desirable to provide an improved shifting system for vehicle transmissions.

SUMMARY OF THE INVENTION AND ADVANTAGES

The present invention provides a shifting system for a vehicle transmission including an input member extending along an axis between a first end and a second end spaced from the first end. The input member is rotatable about the axis. The shifting system also includes a disconnect coupled to the input member, and the disconnect is moveable between a first disconnect position and a second disconnect position. The shifting system further includes an output member spaced from the input member, and the output member is selectively rotatable with the input member about the axis. The shifting system further includes a shifting assembly to selectively rotationally couple the input member and the output member.

The shifting assembly includes an input hub coupled to the input member. The input hub has a disconnectable component engageable with the disconnect that extends along the axis. The disconnectable component of the input hub is disengaged from the disconnect when the disconnect is in the first disconnect position, and the disconnectable component of the input hub is engaged with the disconnect when the disconnect is in the second disconnect position. The input hub also has a clutch engagement component extending radially away from the axis.

The shifting assembly also includes a plurality of clutch plates coupled to the clutch engagement component of the input hub. The plurality of clutch plates are moveable between an engaged position where the plurality of clutch plates are engaged with one another, and a disengaged position where the plurality of clutch plates are disengaged from one another. A biasing member is coupled to the plurality of clutch plates to bias the plurality of clutch plates toward the engaged position.

The shifting assembly further includes an apply plate coupled to the biasing member. The apply plate is moveable between a first plate position where the plurality of clutch plates are in the engaged position, and a second plate position where the apply plate is engaged with the biasing member and the plurality of clutch plates are in the disengaged position.

The shifting assembly further includes a clutch plate carrier coupled to the plurality of clutch plates and to the output member to transmit torque from the clutch engagement component of the input hub through the plurality of clutch plates and the clutch plate carrier to the output member.

Accordingly, the shifting system results in low drag losses, increasing the efficiency of torque transfer between the motor and the vehicle transmission. Moreover, the shifting system produces smooth engagement between the motor and the vehicle transmission through both connection with the disconnect and engagement of the plurality of clutch plates, resulting in fewer vibrations of the vehicle and a more comfortable driving experience. Additionally, because the plurality of clutch plates of the shifting system at rest are in the engaged position due to the biasing member biasing the plurality of clutch plates toward the engaged position, the shifting system is energy efficient. Said differently, because power from an electronic actuator or a hydraulic actuator is not needed to maintain the plurality of clutch plates in the engaged position, the shifting system is energy efficient.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2A is a cross-section view of the shifting system having an apply plate and a plurality of clutch plates, with the disconnect in the first disconnect position where the disconnect is disengaged with an input hub, and the apply plate is in the first plate position where the plurality of clutch plates are in an engaged position;

FIG. 4A is a cross-section view of the shifting system, with the disconnect in the first disconnect position where the disconnect is disengaged with the input hub, and the apply plate is in the first plate position where the plurality of clutch plates are in the engaged position;

FIG. 4B is a cross-section view of the shifting system, with the disconnect in the first disconnect position where the disconnect is disengaged with the input hub, and the apply plate is in the second plate position where the plurality of clutch plates are in the disengaged position;

FIG. 4D is a cross-sectional view of the shifting system, with the disconnect in the second disconnect position where the disconnect is engaged with the input hub, and the apply plate is in the first disconnect position where the plurality of clutch plates are in the engaged position.

DETAILED DESCRIPTION OF THE INVENTION

Figure 1:
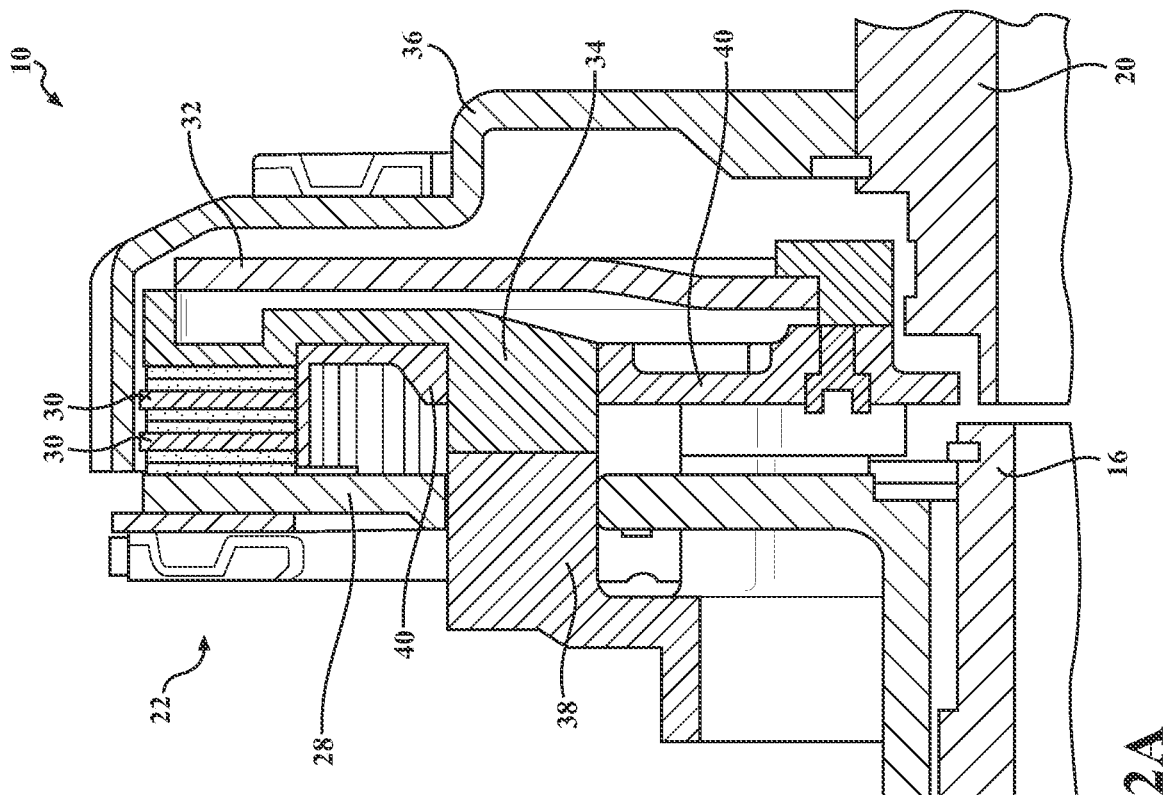
FIG. 1 is a table depicting stages of a shifting system and the engagement status of a disconnect moveable between first and second disconnect positions, and a plurality of clutch plates moveable between engaged and disengaged positions according to the present invention, where X denotes engagement and O denotes disengagement.
Figure 1:
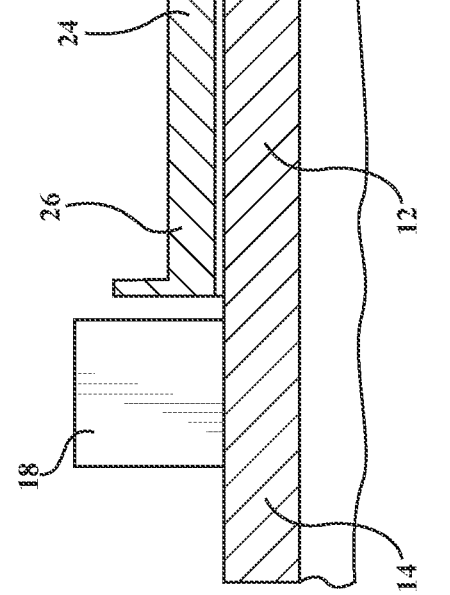
Figure 2B:
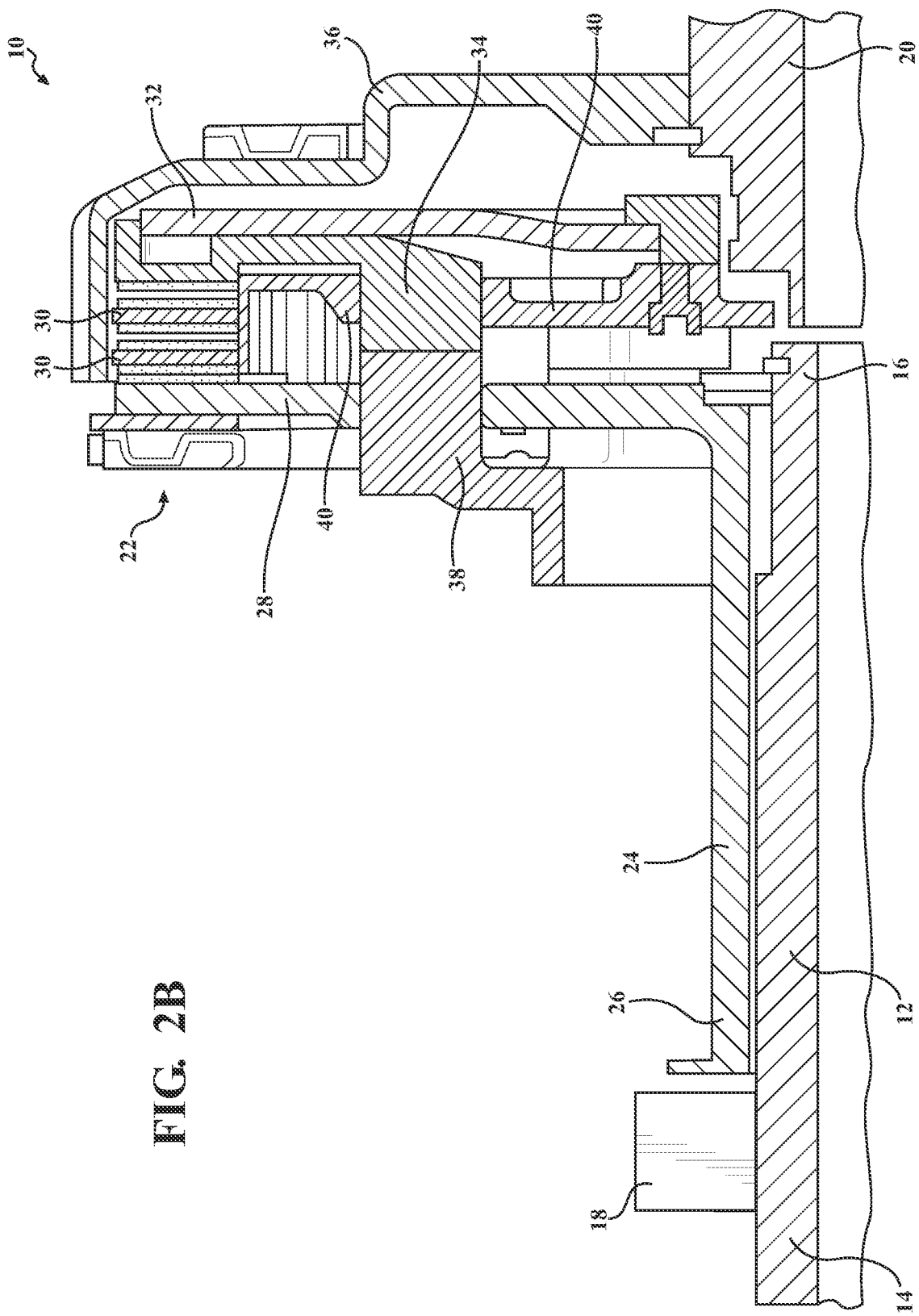
FIG. 2B is a cross-section view of the shifting system, with the disconnect in the first disconnect position where the disconnect is disengaged with the input hub, and the apply plate is in the second plate position where the plurality of clutch plates are in a disengaged position.
Figure 2C:
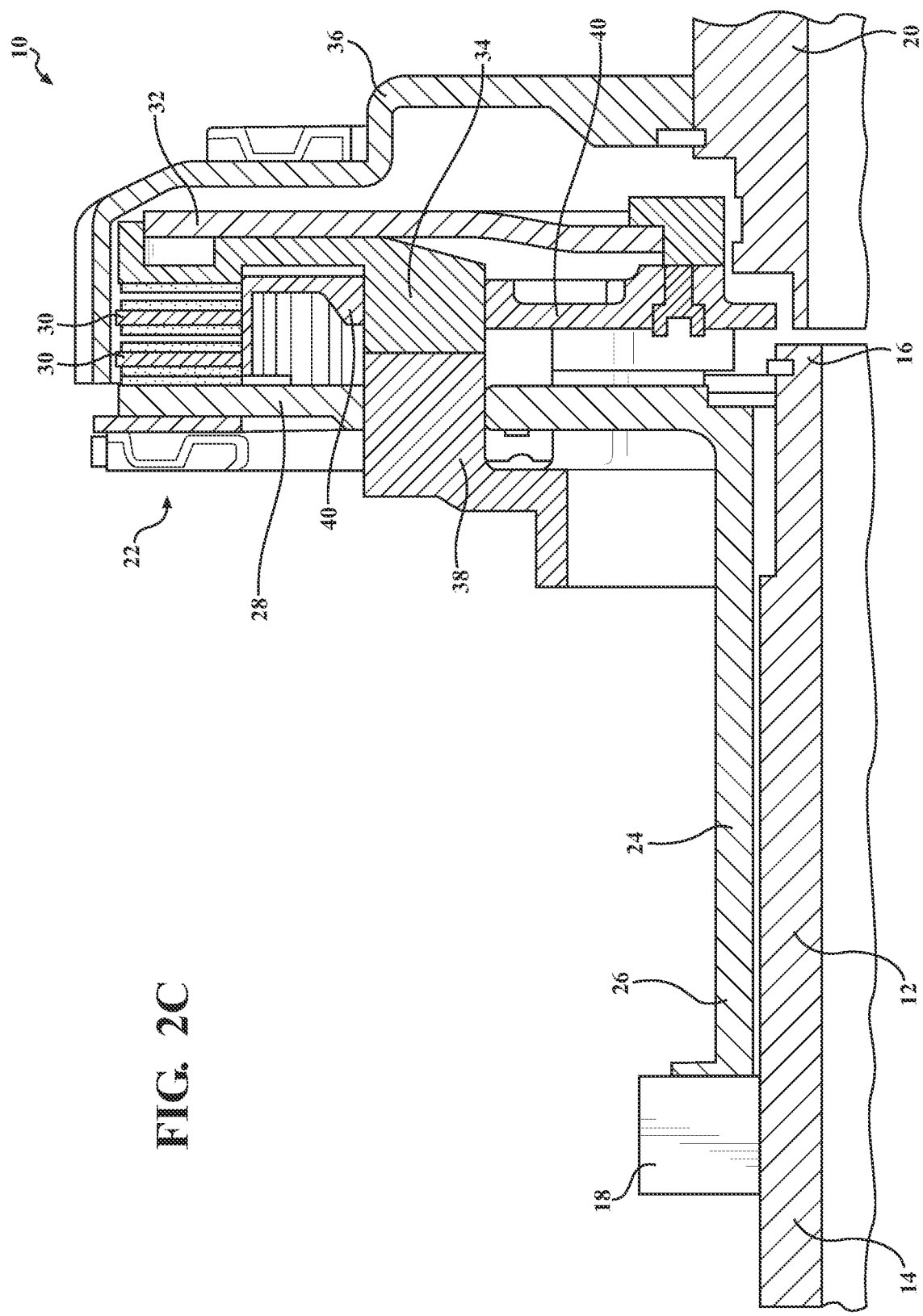
FIG. 2C is a cross-sectional view of the shifting system, with the disconnect in the second disconnect position where the disconnect is engaged with the input hub, and the apply plate is in the second plate position where the plurality of clutch plates are in the disengaged position.
Figure 2D:
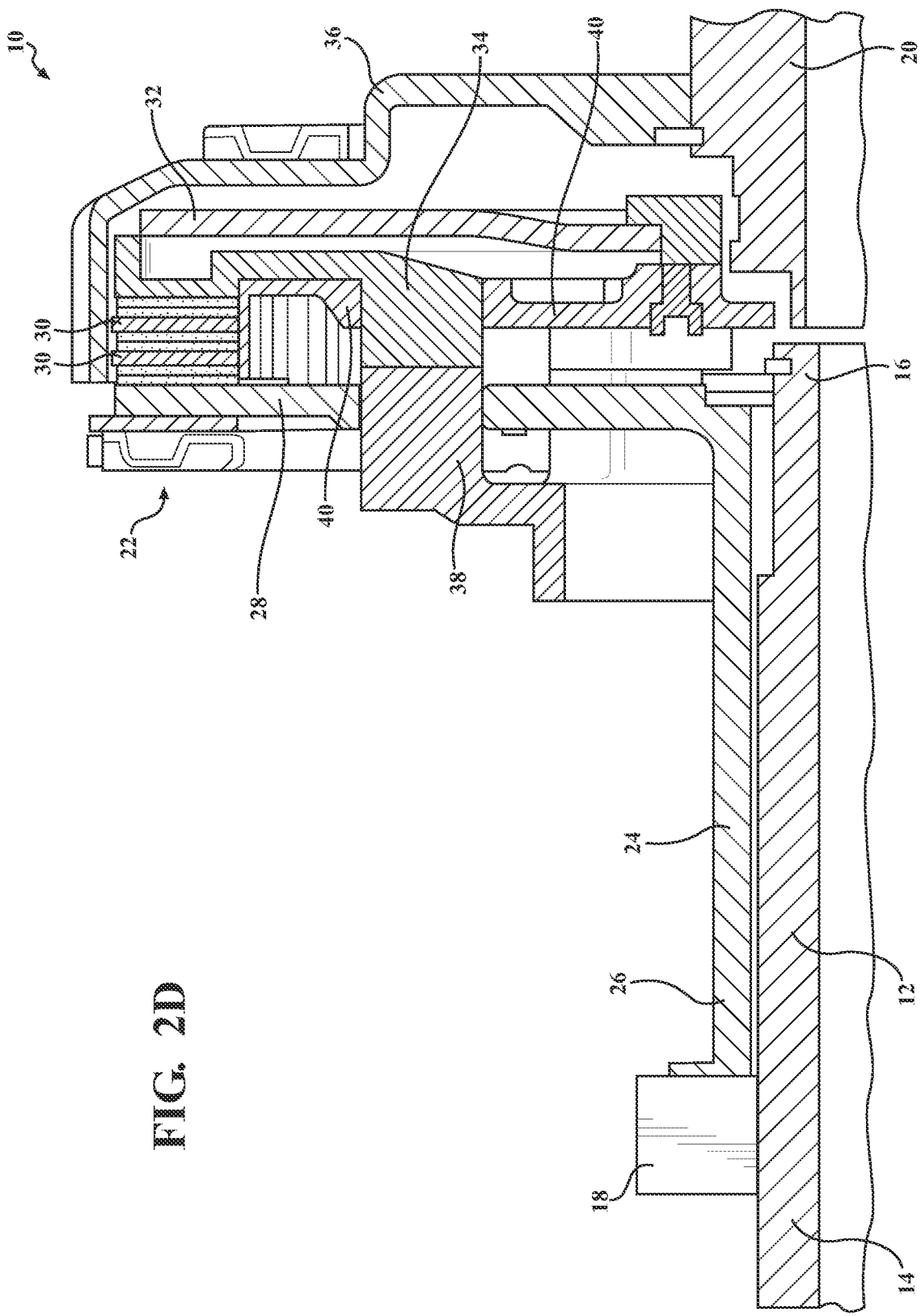
FIG. 2D is a cross-sectional view of the shifting system, with the disconnect in the second disconnect position where the disconnect is engaged with the input hub, and the apply plate is in the first disconnect position where the plurality of clutch plates are in the engaged position.
Figure 3A:
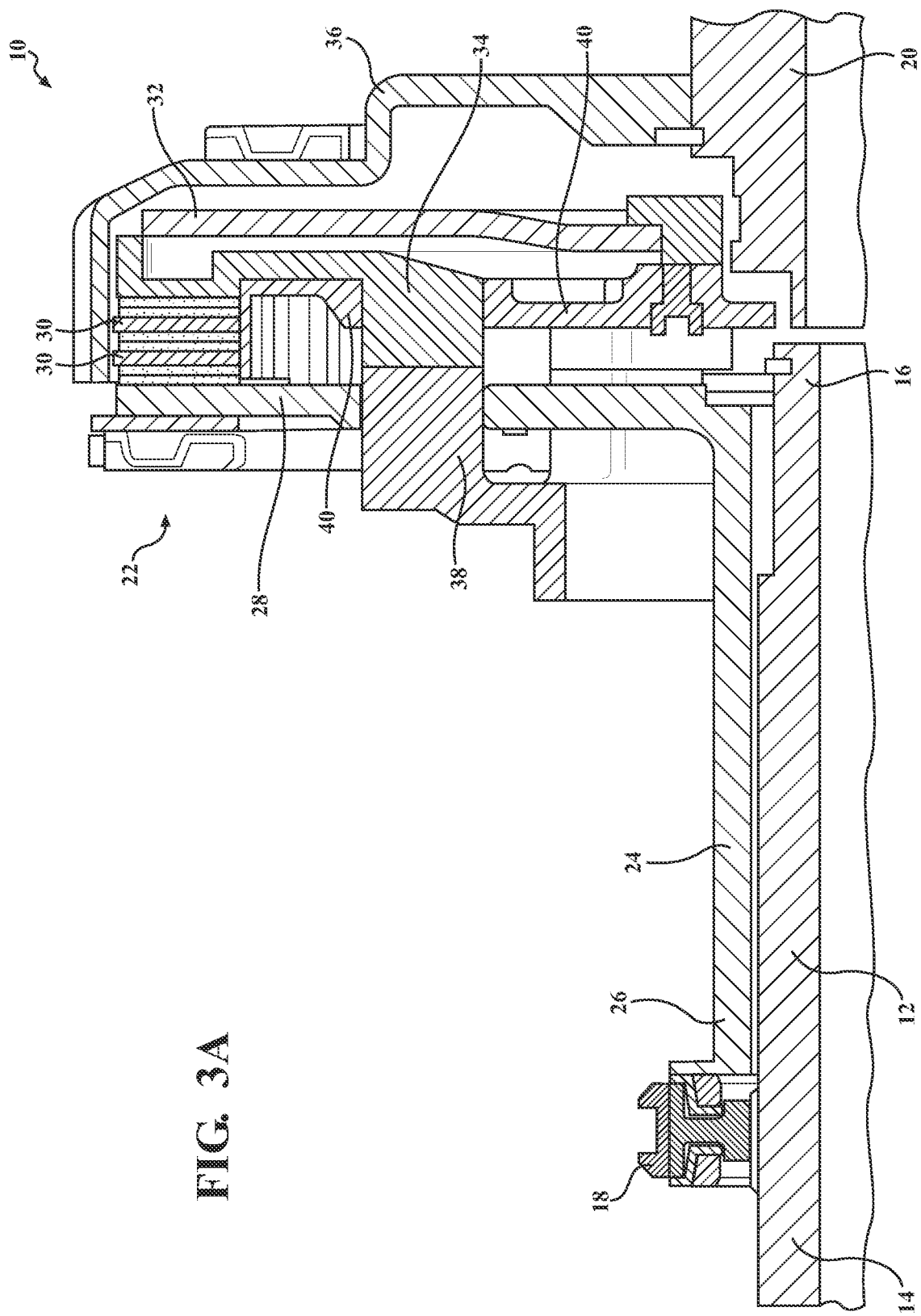
FIG. 3A is a cross-section view of the shifting system, with the disconnect being a synchronizer, and with the disconnect in the first disconnect position where the disconnect is disengaged with an input hub, and the apply plate is in the first plate position where the plurality of clutch plates are in an engaged position.
Figure 3B:
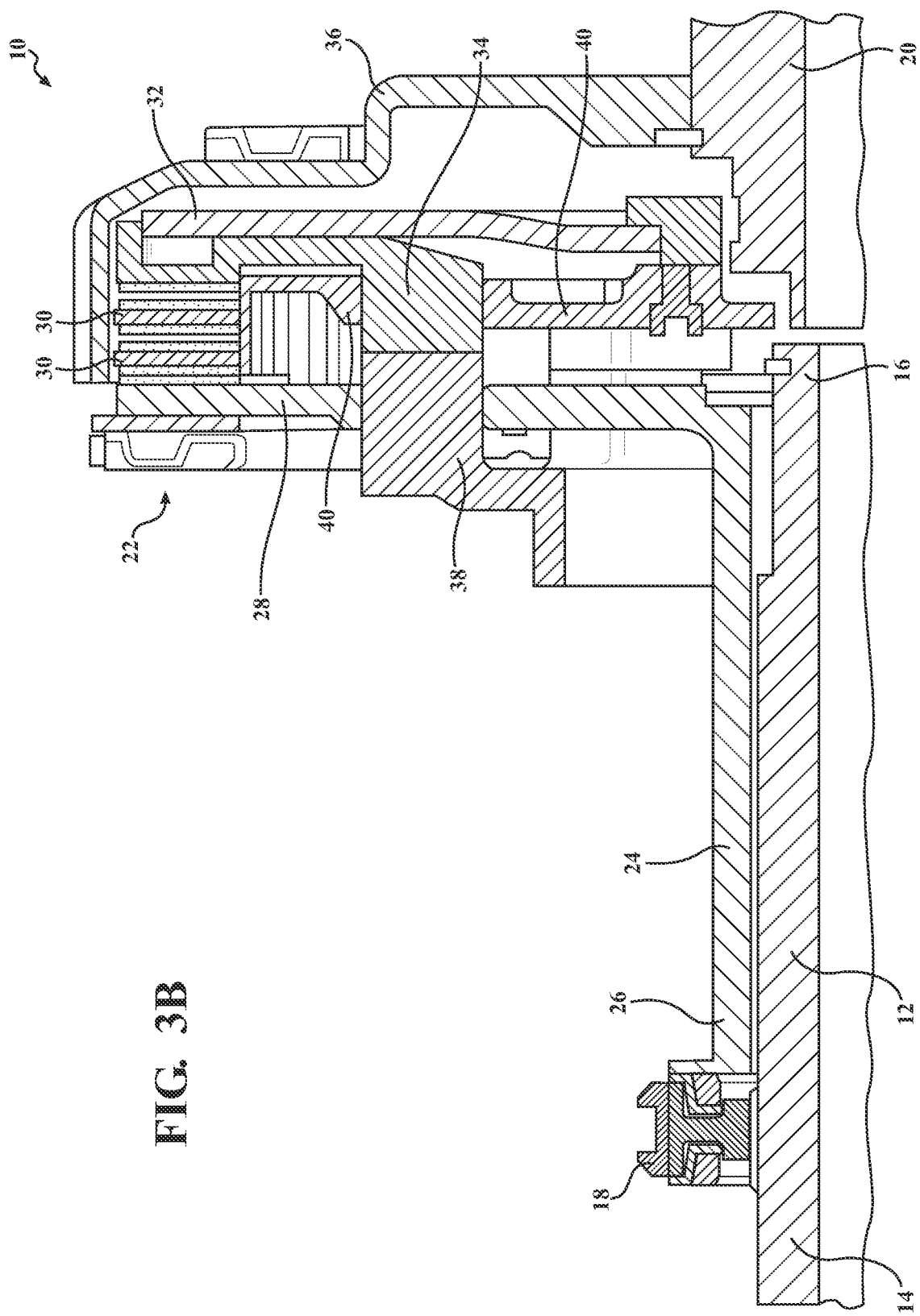
FIG. 3B is a cross-section view of the shifting system, with the disconnect being a synchronizer, and with the disconnect in the first disconnect position where the disconnect is disengaged with the input hub, and the apply plate is in the second plate position where the plurality of clutch plates are in a disengaged position.
Figure 3C:
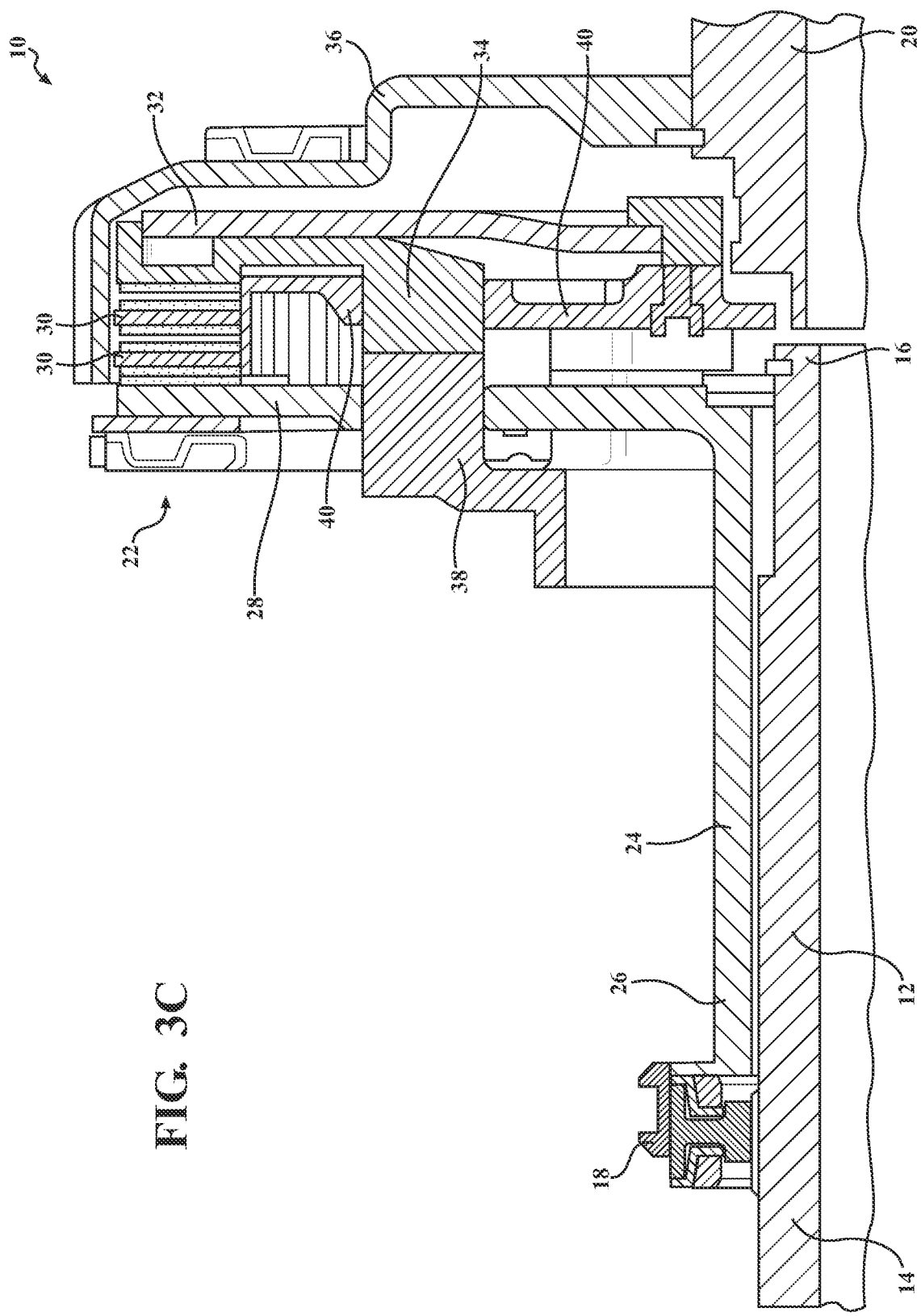
FIG. 3C is a cross-sectional view of the shifting system, with the disconnect being a synchronizer, and with the disconnect in the second disconnect position where the disconnect is engaged with the input hub, and the apply plate is in the second plate position where the plurality of clutch plates are in the disengaged position.
Figure 3D:
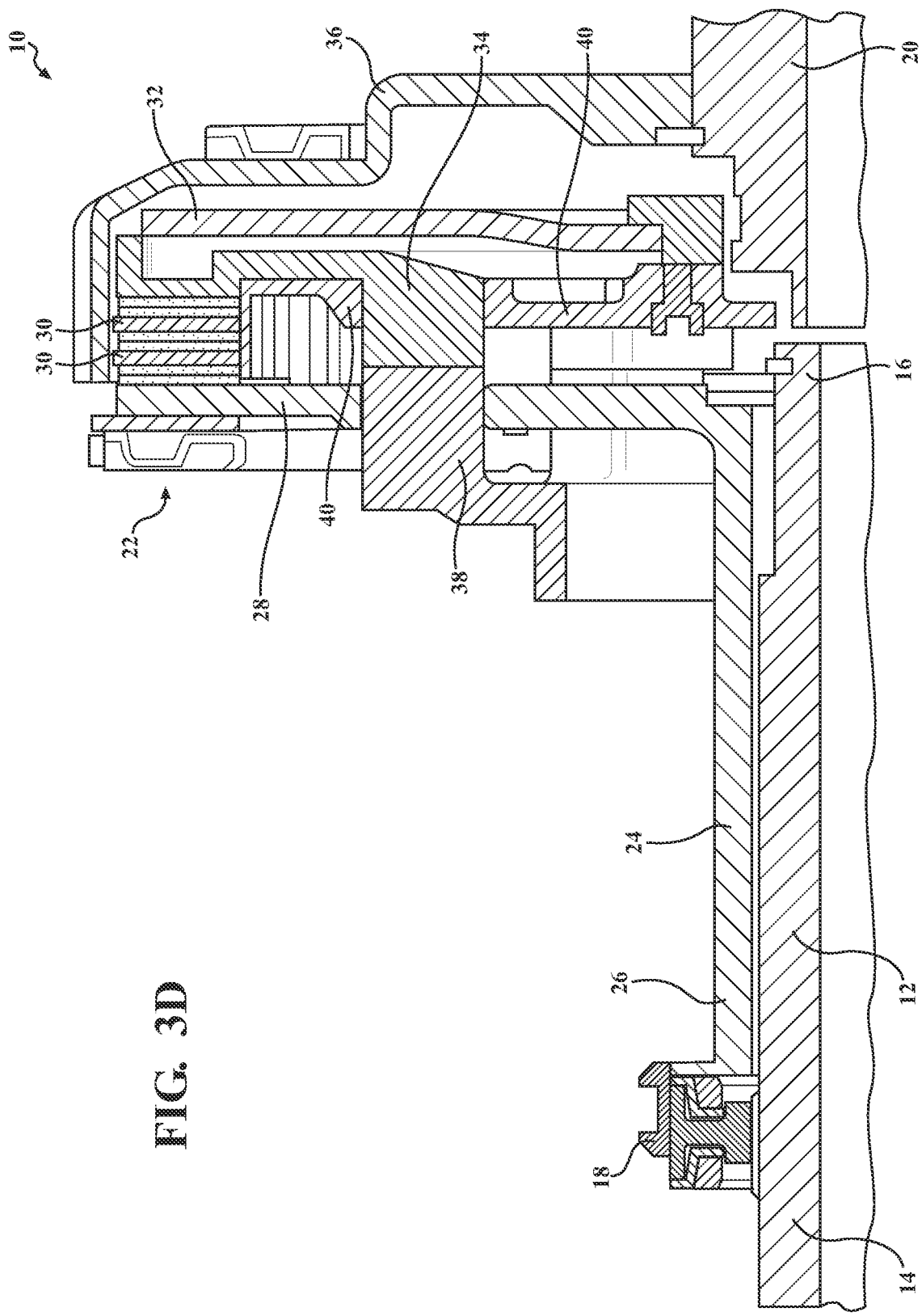
FIG. 3D is a cross-sectional view of the shifting system, with the disconnect being a synchronizer, and with the disconnect in the second disconnect position where the disconnect is engaged with the input hub, and the apply plate is in the first disconnect position where the plurality of clutch plates are in the engaged position.
Figure 4C:
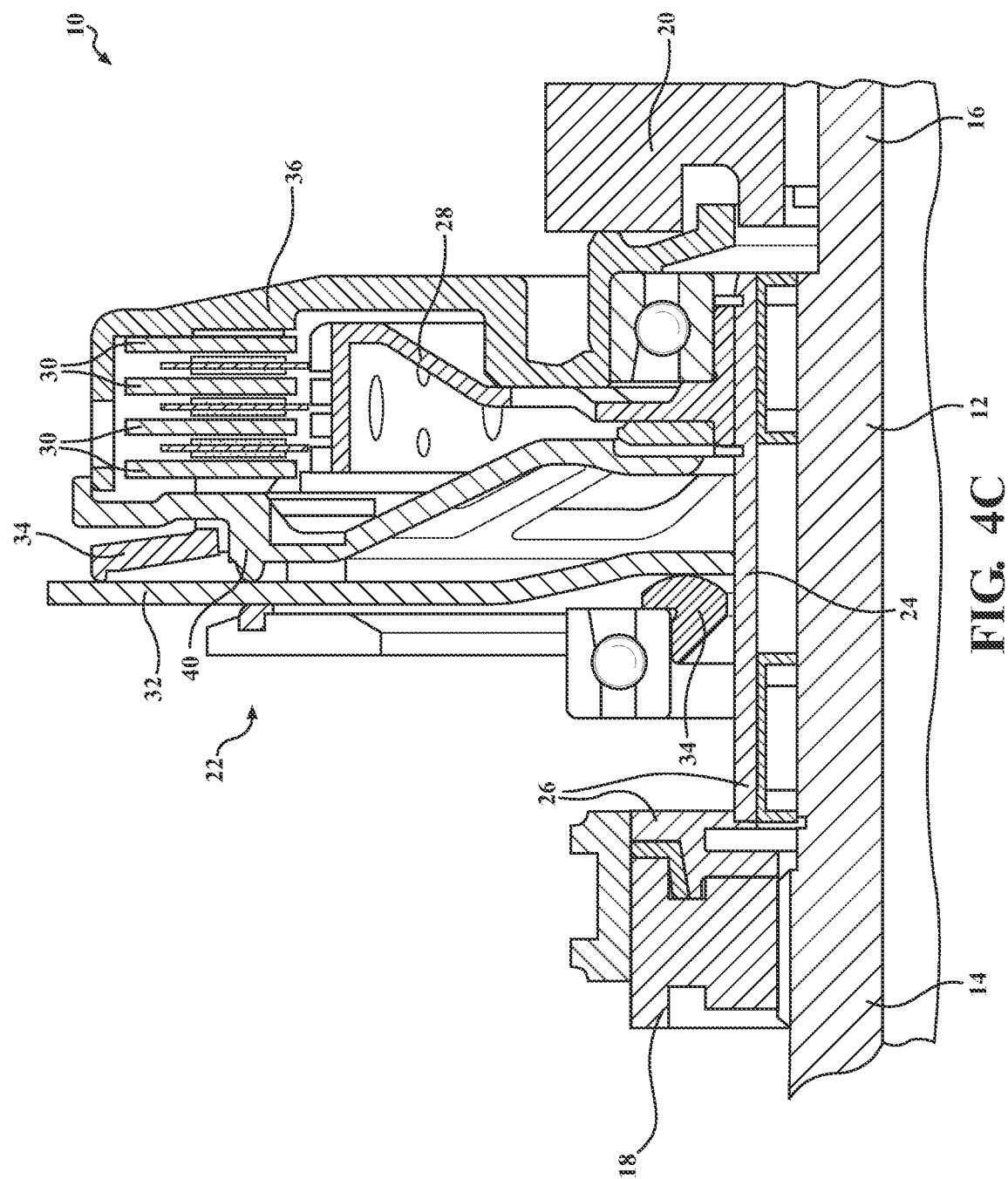
FIG. 4C is a cross-sectional view of the shifting system, with the disconnect in the second disconnect position where the disconnect is engaged with the input hub, and the apply plate is in the second plate position where the plurality of clutch plates are in the disengaged position.

With reference to the Figures, wherein like numerals indicate like parts throughout the several views, a shifting system 10 is shown for use in conjunction with a vehicle transmission. The shifting system 10 includes an input member 12 extending along an axis A between a first end 14 and a second end 16 spaced from the first end 14. The input member 12 is rotatable about the axis A. The shifting system 10 also includes a disconnect 18 coupled to the input member 12. The disconnect 18 is moveable between a first disconnect position (e.g. FIG. 2A) and a second disconnect position (e.g. FIG. 2C). The shifting system 10 further includes an output member 20 spaced from the input member 12, and the output member 20 is selectively rotatable with the input member 12 about the axis A. The shifting system 10 further includes a shifting assembly 22 to selectively rotationally couple the input member 12 and the output member 20.

The shifting assembly 22 includes an input hub 24 coupled to the input member 12. The input hub 24 has a disconnectable component 26 engageable with the disconnect 18 and extending along the axis A. The disconnectable component 26 of the input hub 24 is disengaged from the disconnect 18 when the disconnect 18 is in the first disconnect position, and the disconnectable component 26 of the input hub 24 is engaged with the disconnect 18 when the disconnect 18 is in the second disconnect position. The input hub 24 also has a clutch engagement component 28 extending radially away from the axis A.

The shifting assembly 22 also includes a plurality of clutch plates 30 coupled to the clutch engagement component 28 of the input hub 24. The plurality of clutch plates 30 are moveable between an engaged position where the plurality of clutch plates 30 are engaged with one another, and a disengaged position where the plurality of clutch plates 30 are disengaged from one another. A biasing member 32 is coupled to the plurality of clutch plates 30 to bias the plurality of clutch plates 30 toward the engaged position.

The shifting assembly 22 further includes an apply plate 34 coupled to the biasing member 32. The apply plate 34 is moveable between a first plate position (e.g. FIG. 2A) where the plurality of clutch plates 30 are in the engaged position, and a second plate position (e.g. FIG. 2B) where the apply plate 34 is engaged with the biasing member 32 and the plurality of clutch plates 30 are in the disengaged position.

The shifting assembly 22 further includes a clutch plate carrier 36 coupled to the plurality of clutch plates 30 and to the output member 20 to transmit torque from the clutch engagement component 28 of the input hub 24 through the plurality of clutch plates 30 and the clutch plate carrier 36 to the output member 20.

Accordingly, the shifting system 10 results in low drag losses, increasing the efficiency of torque transfer between the motor and the vehicle transmission. Moreover, the shifting system 10 produces smooth engagement between the motor and the vehicle transmission both through connection with the disconnect 18 and through engagement of the plurality of clutch plates 30, resulting in fewer vibrations of the vehicle and a more comfortable driving experience. Additionally, because the plurality of clutch plates 30 of the shifting system 10 at rest are in the engaged position due to the biasing member 32 biasing the plurality of clutch plates 30 toward the engaged position, the shifting system 10 is energy efficient. Said differently, because power from an electronic actuator or a hydraulic actuator is not needed to maintain the plurality of clutch plates 30 in the engaged position, the shifting system 10 is energy efficient.

The disconnect 18 rotationally disconnects the input member 12 and the disconnectable component 26, thus rotationally disconnecting the input member 12 and the input hub 24. In one embodiment, the disconnect 18 is a disconnect clutch. Alternatively, in another embodiment, the disconnect 18 is a synchronizer. In the embodiments where the disconnect 18 is a synchronizer, the synchronizer may have a synchronizer ring, a synchronizer cone, a synchronizer hub, and a synchronizer sleeve. In yet another embodiment, the disconnect 18 is a dog clutch.

In one embodiment, the apply plate 34 and the disconnect 18 are moveable independent of one another. The apply plate 34 may be moved from the first plate position to the second plate position, resulting in the plurality of clutch plates 30 moving from the engaged position to the disengaged position, independent of whether the disconnect 18 is in the first disconnect position or the second disconnect position and without affecting the position of the disconnect 18. Likewise, the disconnect 18 may be moved from the first disconnect position to the second disconnect position, resulting in the input hub 24 being engaged, independent of whether the apply plate 34 is in the first plate position or the second plate position and without affecting the position of the apply plate 34.

In the embodiment where the apply plate 34 and the disconnect 18 are movable independent of one another, the shifting system 10 may also include a first actuator coupled to the disconnect 18 to move the disconnect 18 from the first disconnect position to the second disconnect position independent of the apply plate 34, and a second actuator coupled to the apply plate 34 to move the apply plate 34 from the first plate position to the second plate position independent of the disconnect 18. It is to be appreciated that the first and second actuators may be moved through, but not limited to, mechanical actuation, electrical actuation, hydraulic actuation, or pneumatic actuation.

In some embodiments, the input member 12 is rotationally coupled to the output member 20 when the disconnect 18 is in the second disconnect position and the apply plate 34 is in the first plate position. In other words, the input member 12 may be rotationally coupled to the output member 20 when the apply plate 34 is in the first plate position where the biasing member 32 is able to bias the plurality of clutch plates 30 toward the engaged position, and when the disconnect 18 is in the second disconnect position where the disconnect 18 is engaged with the input hub 24. In these positions, torque is able to be transmitted from the input member 12, through the input hub 24, the plurality of clutch plates 30, and the clutch plate carrier 36 to the output member 20. In these positions, torque is able to be transmitted from the motor to the vehicle transmission.

In some embodiments, the input member 12 is rotationally decoupled from the output member 20 when the disconnect 18 is in the first disconnect position and/or when the apply plate 34 is in the second plate position. In other words, the input member 12 is rotationally decoupled from the output member 20 when either the disconnect 18 is in the first disconnect position, the apply plate 34 is in the second plate position, or both the disconnect 18 is in the first disconnect position and the apply plate 34 is in the second plate position. In these positions, torque is unable to be transferred from the input member to the output member and, as a result, torque is unable to be transferred from the motor to the vehicle transmission.

The disconnect 18 and the plurality of clutch plates 30 are disposed in series with one another in the embodiments where the input member 12 is rotationally coupled to the output member 20 only when the disconnect 18 is in the second disconnect position and the apply plate 34 is in the first plate position. Said differently, if either the disconnect 18 is in the first disconnect position where the disconnect 18 is disengaged from the input hub 24, or the apply plate 34 is in the second plate position where the plurality of clutch plates 30 are disengaged, then the input member 12 is rotationally decoupled from the output member 20. Therefore, when disposed in series, both the disconnect 18 must be engaged with the input hub 24 and the plurality of clutch plates 30 must be engaged with one another 30 to transfer torque from the input member 12 to the output member 20, and therefore to transfer torque from the motor to the vehicle transmission.

The disconnectable component 26 of the input hub 24 and the clutch engagement component 28 of the input hub 24 may be integral with one another. Alternatively, the disconnectable component 26 of the input hub 24 and the clutch engagement component 28 of the input hub 24 may be separate components, as shown in FIGS. 2A-4D. In the embodiments shown in FIGS. 2A-3D, the clutch engagement component 28 of the input hub 24 may be rotationally connected to the disconnectable component 26 of the input hub 24 through use of keys, tabs, or bolts. It is to be appreciated that the input hub 24 may be more than two components, and may include a third component or more to transmit torque from the input member 12 to the plurality of clutch plates 30.

In some embodiments, as shown in FIGS. 2A-3D, the shifting assembly 22 further includes an intermediate apply plate 38 coupled to the apply plate 34 such that the apply plate 34 is disposed between the intermediate apply plate 38 and the biasing member 32. The apply plate 34 is contactable by the intermediate apply plate 38 in the first plate position to engage the plurality of clutch plates 30. In this embodiment, the intermediate apply plate 38 transmits force to the apply plate 34, and thus to the biasing member 32, to move the biasing member 32 and result in the plurality of clutch plates 30 being in the disengaged position. It is to be appreciated that the intermediate apply plate 38 may also be commonly referred to as a release plate.

Although not required, the shifting assembly 22 may also include a support ring 40 disposed between the biasing member 32 and the clutch engagement component 28 to support the plurality of clutch plates 30. The support ring 40 may be disposed about the axis A, and may be rotatable with either the input member 12 or the output member 20. The support ring 40 may be spaced from the plurality of clutch plates 30 along the axis A, as shown in FIGS. 4A-4D, and may be rotationally coupled to the clutch plate carrier 36.

In some embodiments, as shown in FIGS. 4A-4D, the biasing member is spaced from the clutch engagement component of the input hub 24 and the clutch plate carrier 36 along the axis A such that the clutch engagement component 28 of the input hub 24 is disposed between the biasing member 32 and the clutch plate carrier 36. In this embodiment, the support ring 40 is disposed between the biasing member 32 and the plurality of clutch plates 30, is disposed between the biasing member 32 and the clutch engagement component 28 of the input hub 24.

In other embodiments, as shown in FIGS. 2A-3D, the clutch engagement component 28 of the input hub 24 is spaced from the biasing member 32 and the clutch plate carrier 36 along the axis A such that the biasing member 32 is disposed between the clutch engagement component 28 of the input hub 24 and the clutch plate carrier 36. In this embodiment, the support ring 40 is disposed between the biasing member 32 and the clutch engagement component 28.

In some embodiments, the biasing member 32 is a Belleville spring. It is to be appreciated, however, that the biasing member 32 may be any type of spring, including, but not limited to, a wave spring, a coil spring, and a conical spring.

As shown in FIGS. 2A-3D, the output member 20 may be spaced from the input member 12 along the axis A. In the embodiments where the output member 20 is spaced from the input member 12 along the axis A, the input member 12 may be a shaft, and the output member 20 may also be a shaft. In this embodiment, the output member 20 may be the sole output of the shifting system 10.

It is to be appreciated that in the embodiments illustrated in FIGS. 2A-3D, the apply plate 34 may translate along the axis from the first plate position to the second plate position to translate the biasing member 32 along the axis. In doing so, the plurality of clutch plates 30 are moved from the engaged position to the disengaged position.

As shown in FIGS. 4A-4D, the output member 20 may be radially spaced from and disposed about the input member 12. In the embodiments where the output member 20 is radially spaced from and disposed about the input member 12, the output member 20 may be one of at least two outputs of the shifting system 10. Another output other than the output member 20 itself may be the input member 12. Said differently, if the disconnect 18 is in the first disconnect position or the apply plate 34 is in the second plate position, the input member 12 may still be able to transfer torque to the vehicle transmission. It is to be appreciated that the output member 20 may be a gear in the embodiments where the output member 20 is radially spaced from and disposed about the input member 12.

It is to be appreciated that in the embodiments illustrated in FIGS. 4A-4D, the biasing member 32 may pivot about a pivot point of the biasing member 32 when a section of the apply plate 34 closest to the input member 12 is translated along the axis. In doing so, a section of the apply plate 34 furthest from the input member 12 is moved away from the plurality of clutch plates 30, and the plurality of clutches 30 are moved from the engaged position to the disengaged position. It is to be appreciated that the pivot point at which the biasing member 32 may pivot is shown where the support ring 40 and an additional backing plate both contact the biasing member 32. The areas of contact of the support ring 40 and additional backing plate where the support ring 40 and/or the additional backing plate contact the biasing member 32 may be hardened against wear.

A method of operating the shifting system 10 is also provided. The method includes the step of disengaging the plurality of clutch plates 30 by moving the apply plate 34 from the first plate position where the plurality of clutch plates 30 are in the engaged position to the second plate position where the apply plate 34 is engaged with the biasing member 32 and the plurality of clutch plates 30 are in the disengaged position. The method also includes the step of engaging the disconnect 18 by moving the disconnect 18 from the first disconnect position where the disconnectable component of the input hub 24 is disengaged from the disconnect 18 to the second disconnect position where the disconnectable component 26 of the input hub 24 is engaged with the disconnect 18 when the disconnect 18 is in the second disconnect position. The method further includes the step of reengaging the plurality of clutch plates 30 by moving the apply plate 34 from the second plate position where the plurality of clutch plates 30 are in the disengaged position to the first plate position where the plurality of clutch plates 30 are in the engaged position.

The method allows the input member 12 and the output member 20 to be smoothly engaged and rotationally coupled with one another. The disengagement and subsequent reengagement of the plurality of clutch plates 30 by moving the apply plate 34 from the first plate position to the second plate position, and subsequently from the second plate position to the first plate position, allows the input member 12 and the output member 20 to be smoothly rotationally coupled. Additionally, reengagement of the plurality of clutch plates 30 lowers the drag losses associated with rotationally coupling the input member 12 and the output member 20.

The step of disengaging the plurality of clutch plates 30 may precede the step of engaging the disconnect 18 to prevent the input member 12 and the output member 20 from rotationally coupling through the disconnect 18. In the embodiments where the step of disengaging the plurality of clutch plates 30 precedes the step of engaging the disconnect 18, the disconnect 18 is engaged while the plurality of clutch plates 30 are in the disengaged position, thus the disconnect 18 is engaged also while the input member 12 is rotationally decoupled from the output member 20. Engaging the disconnect 18 when the input member 12 is rotationally decoupled from the output member 20 prevents the engagement of the disconnect 18 from causing the motor and the vehicle transmission to engage roughly.

The step of engaging the disconnect 18 may precede the step of reengaging the plurality of clutch plates 30 to allow the input member 12 and the output member 20 to smoothly rotationally couple through the engagement of the plurality of clutch plates 30. When the disconnect 18 is in the second disconnect position and engaged with the disconnectable component 26 of the input hub 24, the reengagement of the plurality of clutch plates 30 simultaneously occurs with the rotational coupling of the input member 12 and the output member 20. Thus, by reengaging the plurality of clutch plates 30 after engaging the disconnect 18, the rotational coupling of the input member 12 and the output member 20 is accomplished smoothly. Therefore, transmission of torque from the motor to the vehicle transmission is also accomplished smoothly. In this way, a more comfortable driving experience is achieved.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A shifting system for a vehicle transmission comprising;
   an input member extending along an axis between a first end and a second end spaced from the first end, with said input member rotatable about said axis;
   a disconnect coupled to said input member and moveable between a first disconnect position and a second disconnect position;
   an output member spaced from said input member, said output member selectively rotatable with said input member about said axis; and
   a shifting assembly to selectively rotationally couple said input member and said output member, said shifting assembly comprising;
      an input hub coupled to said input member, with said input hub having a disconnectable component engageable with said disconnect and extending along said axis, where said disconnectable component of said input hub is disengaged from said disconnect when said disconnect is in said first disconnect position and where said disconnectable component of said input hub is engaged with said disconnect when said disconnect is in said second disconnect position, and with said input hub having a clutch engagement component extending radially away from said axis;

a plurality of clutch plates coupled to said clutch engagement component of said input hub, with said plurality of clutch plates moveable between an engaged position where said plurality of clutch plates are engaged with one another, and a disengaged position where said plurality of clutch plates are disengaged from one another;

a biasing member coupled to said plurality of clutch plates to bias said plurality of clutch plates toward said engaged position;

an apply plate coupled to said biasing member, with said apply plate moveable between a first plate position where said plurality of clutch plates are in said engaged position, and a second plate position where said apply plate is engaged with said biasing member and said plurality of clutch plates are in said disengaged position; and a clutch plate carrier coupled to said plurality of clutch plates and to said output member to transmit torque from said clutch engagement component of said input hub through said plurality of clutch plates and said clutch plate carrier to said output member.

2. The shifting system as set forth in claim 1, wherein said apply plate and said disconnect are moveable independent of one another.

3. The shifting system as set forth in claim 2 further comprising a first actuator coupled to said disconnect to move said disconnect from said first disconnect position to said second disconnect position independent of said apply plate, and a second actuator coupled to said apply plate to move said apply plate from said first plate position to said second plate position independent of said disconnect.

4. The shifting system as set forth in claim 1, wherein said input member is rotationally coupled to said output member when said disconnect is in said second disconnect position and said apply plate is in said first plate position.

5. The shifting system as set forth in claim 1, wherein said input member is rotationally decoupled from said output member when said disconnect is in said first disconnect position and/or when said apply plate is in said second plate position.

6. The shifting system as set forth in claim 1, wherein said disconnectable component of said input hub and said clutch engagement component of said input hub are integral with one another.

7. The shifting system as set forth in claim 1, wherein said shifting assembly further comprises an intermediate apply plate coupled to said apply plate such that said apply plate is disposed between said intermediate apply plate and said biasing member, with said apply plate contactable by said intermediate apply plate in said first plate position to engage said plurality of clutch plates.

8. The shifting system as set forth in claim 1, wherein said shifting assembly further includes a support ring disposed between said biasing member and said clutch engagement component to support said plurality of clutch plates.

9. The shifting system as set forth in claim 1, wherein said biasing member is spaced from said clutch engagement component of said input hub and said clutch plate carrier along said axis such that said clutch engagement component of said input hub is disposed between said biasing member and said clutch plate carrier.

10. The shifting system as set forth in claim 1, wherein said clutch engagement component of said input hub is spaced from said biasing member and said clutch plate carrier along said axis such that said biasing member is disposed between said clutch engagement component of said input hub and said clutch plate carrier.

11. The shifting system as set forth in claim 1, wherein said biasing member is a Belleville spring.

12. The shifting system as set forth in claim 1, wherein said output member is spaced from said input member along said axis.

13. The shifting system as set forth in claim 1, wherein said output member is radially spaced from and disposed about said input member.

14. A shifting assembly for selectively rotationally coupling an input member and an output member, with a disconnect coupled to the input member, said shifting assembly comprising;

an input hub configured to be coupled to the input member, and having a disconnectable component configured to be coupled to the disconnect and extending along an axis, with said disconnectable component configured to be selectively engaged by the disconnect, and with said input hub having a clutch engagement component extending radially away from said axis;

a plurality of clutch plates coupled to said clutch engagement component of said input hub, with said plurality of clutch plates moveable between an engaged position where said plurality of clutch plates are engaged with one another, and a disengaged position where said plurality of clutch plates are disengaged from one another;

a biasing member coupled to said plurality of clutch plates to bias said plurality of clutch plates toward said engaged position;

an apply plate coupled to said biasing member, with said apply plate moveable between a first plate position where said plurality of clutch plates are in said engaged position, and a second plate position where said apply plate is engaged with said biasing member and said plurality of clutch plates are in said disengaged position; and a clutch plate carrier coupled to said plurality of clutch plates and to said output member to transmit torque from said clutch engagement component of said input hub through said plurality of clutch plates and said clutch plate carrier to said output member.

15. The shifting assembly as set forth in claim 14, wherein said disconnectable component of said input hub and said clutch engagement component of said input hub are integral with one another.

16. The shifting assembly as set forth in claim 14 further comprising an intermediate apply plate coupled to said apply plate such that said apply plate is disposed between said intermediate apply plate and said biasing member, with said apply plate contactable by said intermediate apply plate in said first plate position to engage said plurality of clutch plates.

17. The shifting assembly as set forth in claim 14, wherein said shifting assembly further includes a support ring disposed between said biasing member and said clutch engagement component to support said plurality of clutch plates.

18. A method of operating a shifting system, the shifting system comprising an input member extending along an axis between a first end and a second end spaced from the first end, with the input member rotatable about the axis, a disconnect coupled to the input member, an output member spaced from the input member along the axis, the output member selectively rotatable with the input member about the axis; and a shifting assembly to selectively rotationally couple the input member and the output member, the shifting assembly comprising; an input hub coupled to the input member, with the input hub having a disconnectable component coupled to the disconnect and extending along the axis, and with the input hub having a clutch engagement component extending radially away from the axis; a plurality of clutch plates coupled to the clutch engagement component of the input hub; a biasing member coupled to the plurality of clutch plates to bias the plurality of clutch plates toward an engaged position; an apply plate coupled to the biasing member; and a clutch plate carrier coupled to the plurality of clutch plates and to the output member to transmit torque from the clutch engagement component of the input hub through the plurality of clutch plates and the clutch plate carrier to the output member, said method comprising;

disengaging the plurality of clutch plates by moving the apply plate from the first plate position where the plurality of clutch plates are in an engaged position where the plurality of clutch plates are engaged with one another, to the second plate position where the apply plate is engaged with the biasing member and the plurality of clutch plates are in a disengaged position where the plurality of clutch plates are disengaged from one another;

engaging the disconnect by moving the disconnect from a first disconnect position where the disconnectable component of the input hub is disengaged from the disconnect to a second disconnect position where the disconnectable component of the input hub is engaged with the disconnect when the disconnect is in the second disconnect position, and reengaging the plurality of clutch plates by moving the apply plate from the second plate position where the plurality of clutch plates is in the disengaged position to the first plate position where the plurality of clutch plates is in the engaged position.

19. The method as set forth in claim 18, wherein the step of disengaging the plurality of clutch plates precedes the step of engaging the disconnect to prevent the input member and the output member from rotationally coupling through the disconnect.

20. The method as set forth in claim 18, wherein the step of engaging the disconnect precedes the step of reengaging the plurality of clutch plates to allow the input member and the output member to rotationally couple smoothly through the engagement of the plurality of clutch plates.

* * * * *